Jan. 16, 1951 L. H. BEDFORD ET AL 2,538,438
ELECTRICAL APPARATUS
Original Filed Feb. 25, 1944
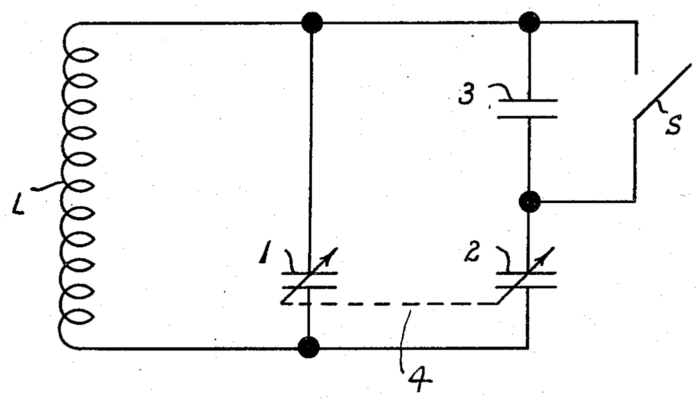
Inventors
Leslie H. Bedford
Arthur H. A. Wynn
By Ralph B. Stewart
attorney Patented Jan. 16, 1951 2,538,438

UNITED STATES PATENT OFFICE 2,538,438

ELECTRICAL APPARATUS

Leslie Herbert Bedford and Arthur Henry Ashford Wynn, London, England, assignors to A. C. Cossor Limited, London, England, a British company Original application February 25, 1944, Serial No. 523,890. Divided and this application February 9, 1949, Serial No. 75,412. In Great Britain February 26, 1943

3 Claims. (Cl. 250—40)

This invention relates to tuning systems for resonant electric circuits, and is particularly applicable to radio equipment intended for operation on frequencies of the order of megacycles or tens of megacycles.

The principal object of the present invention is to provide an improved tuning system whereby the resonance frequency of a variable frequency circuit can readily be changed by a fixed amount which is constant irrespective of the frequency to which the circuit is tuned before the change is made.

A further object is to provide a tuning system wherein this frequency change can be made by means of a simple switch and condenser arrangement.

One embodiment of the present invention will now be described, by way of example, with reference to the accompanying drawing which is a schematic circuit diagram of the embodiment.

The circuit shown may be required, for example, in high frequency radio equipment which serves alternately as a transmitter and as a superheterodyne receiver, both operating on the same signal frequency, and wherein the same oscillator is used for sending and receiving. In such an equipment, the resonant frequency must be changed, by an amount equal to the relatively small intermediate frequency, when switching over from sending to receiving. In the circuit shown, this result is achieved by switching an additional condenser into or out of circuit.

In the drawing an inductance L is tuned by the resultant capacity of a network of condensers 1, 2, and 3. Condensers 1 and 2 are connected in separate paths across inductance L, and the frequency of the circuit is varied by simultaneous variation of condensers 1 and 2 by suitable ganging means represented at 4. Fixed condenser 3 is connected in series with variable condenser 2 and may be short-circuited by switch S. The resonant frequency is decreased, by an amount independent of the setting of ganged variable condensers 1 and 2, by closing switch S and thereby eliminating fixed condenser 3 from the circuit. In order to obtain this independence it is necessary that the capacity variations of condenser 2 shall be determined throughout its range of variation according to a special law. This law may most simply be expressed by stating the capacity of condenser 2 in terms of invariable quantities and of the resonant frequency. Thus stated the law is as follows:

$$C_2=\frac{C}{2}\left(1+\sqrt{1+\frac{4C_3}{C}}\right)$$

where $$C=\frac{1}{4\pi^2L}\left(\frac{1}{f^2}-\frac{1}{(f+F)^2}\right)$$

$C_2$ = capacitance of condenser 2, $C_3$ = capacitance of condenser 3, $f$ = resonant frequency, that is to say the frequency $$½\pi\sqrt{LC_x}$$

where $$C_x=C_1+\frac{C_2C_3}{C_2+C_3}$$

and

F = fixed frequency change effected by closing switch S.

The vane shapes for condenser 2 will, of course, depend upon the vane shapes of condenser 1. If condenser 1 has a straight-line-capacity law and the maximum values of condensers 1 and 2 are fairly nearly equal, the vane shapes for condenser 2 are particularly convenient, while condenser 3 may be sufficiently large to swamp variations of capacity across switch S.

In practice, small trimming condensers will usually be provided in parallel with condensers 2 and 3 for final adjustments of the circuits so that the tracking is as nearly accurate as possible.

This application is a division of abandoned application, Serial No. 523,890, filed February 25, 1944, the subject matter of which is being claimed in continuation application, Serial No. 87,268, filed April 13, 1949.

We claim:

1. A resonant circuit comprising an inductor, a variable capacitor connected in parallel with said inductor whose capacitance changes with movement of a movable member thereof in accordance with a first law, a series arrangement of a fixed capacitor and a variable capacitor also connected in parallel with said inductor, means providing mechanical ganging between said variable capacitors, and a switch device connected to short-circuit said fixed capacitor and thereby to change the resonance frequency of said circuit, said variable capacitor in said series arrangement having capacity determining structure distributed over the range of movement of said ganging means according to a second law differing from said first law and such that actuation of said switch device produces a constant change in the resonance frequency of said circuit irrespective of the setting of said ganging means.

2. A resonant circuit comprising an inductor, a variable capacitor connected in parallel with said inductor and producing equal changes in capacity for equal movements of its movable element, a series arrangement of a fixed capacitor and a variable capacitor also connected in parallel with said inductor, means providing mechanical ganging between said variable capacitors, and a switch device connected to short-circuit said fixed capacitor and thereby to change the resonance frequency of said circuit, said variable capacitor in said series arrangement having capacity determining structure distributed over the range of movement of its movable element to produce unequal changes in capacity for equal movements of said ganging means so that operation of said switch device produces a constant change in the resonant frequency of the circuit irrespective of the setting of said ganged condensers.

3. A resonant circuit comprising an inductor of inductance L, a variable capactor of capacitance $C_1$ connected in parallel with said inductor, a series arrangement of a variable capacitor of capacitance $C_2$ and a fixed capacitor of capacitance $C_3$ also connected in parallel with said inductor, means providing mechanical ganging between said variable capacitors, and a switch device connected to short-circuit said fixed capacitor to change the resonance frequency of said circuit, said variable capacitors having capacity determining structure distributed over the range of setting of said mechanical ganging means substantially to satisfy the formula $$C_2=\frac{C}{2}\left(1+\sqrt{1+\frac{4C_3}{C}}\right)$$

where $$C=\frac{1}{4\pi^2L}\left(\frac{1}{f^2}-\frac{1}{(f+F)^2}\right)$$

$$f=1/2\pi\sqrt{LC_x},\ C_x=C_1+\frac{C_2C_3}{C_2+C_3}$$

and F=the frequency change effected by closing said switch device, whereby F is a substantially constant frequency change irrespective of the setting of said ganging means.

LESLIE HERBERT BEDFORD.
ARTHUR HENRY ASHFORD WYNN.

REFERENCES CITED

The following references are of record in the file of this patent:

FOREIGN PATENTS

| Number | Country | Date |
|---|---|---|
| 490,206 | Great Britain | Aug. 8, 1938 |

OTHER REFERENCES

"The Wireless World," November 17, 1938, title, "Band Spreading" by G. C. F. Whitaker.